B. D. WHITE.
APPARATUS FOR PASTEURIZING SUBSTANCES.
APPLICATION FILED APR. 11, 1913.
1,144,883.
Patented June 29, 1915.
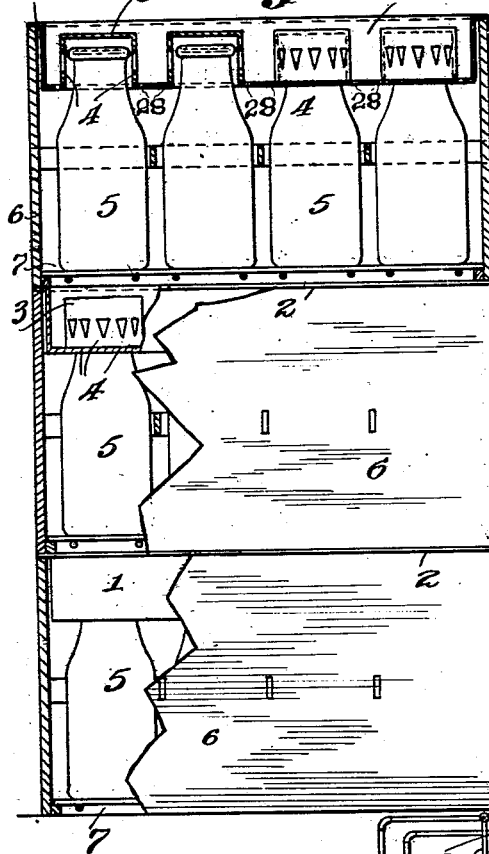
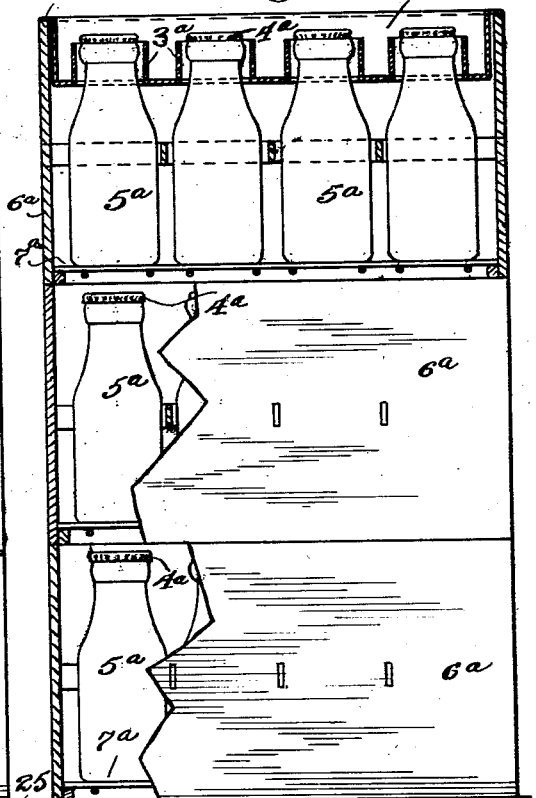
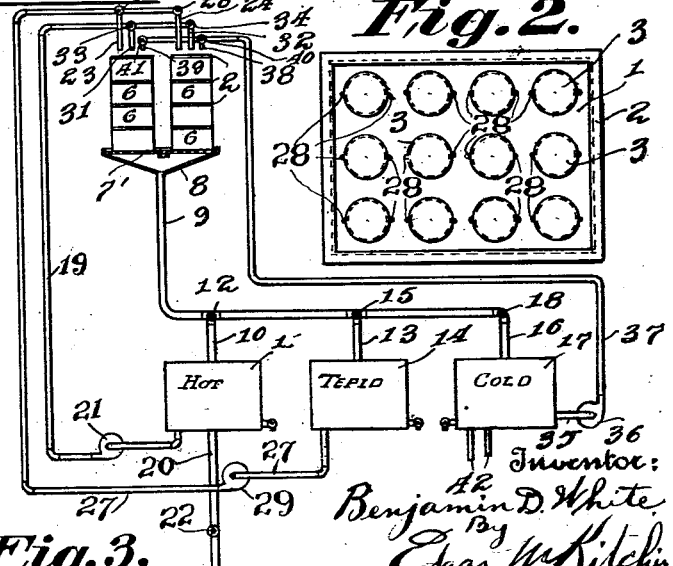

UNITED STATES PATENT OFFICE.

BENJAMIN D. WHITE, OF BALTIMORE, MARYLAND.

APPARATUS FOR PASTEURIZING SUBSTANCES.

1,144,883.  Specification of Letters Patent.  Patented June 29, 1915.

Application filed April 11, 1913. Serial No. 760,527.

*To all whom it may concern:*

Be it known that I, BENJAMIN D. WHITE, a citizen of the United States, residing at Baltimore, in the State of Maryland, have invented certain new and useful Improvements in Apparatus for Pasteurizing Substances; and I do hereby declare the following to be a full, clear, and exact description of the invention, such as will enable others skilled in the art to which it appertains to make and use the same.

This invention is characterized by its object to enable effective pasteurization of milk or other substances in an inexpensive manner and while contained in the receptacles in which the milk or other substances is or are ordinarily delivered.

A further object is the pasteurization of milk while in the delivery bottles and disposed in the delivery cases.

With these and other objects in view, as will hereinafter in part become apparent, and in part be stated, the invention comprises certain novel constructions, combinations and arrangements of parts as will be subsequently disclosed and claimed.

In the accompanying drawing,—Figure 1 is a view in side elevation of a series of delivery crates or cases, parts being broken away and seen in section for disclosing interior structure. Fig. 2 is a top plan view thereof on a reduced scale. Fig. 3 is a diagrammatic view of the entire system. Fig. 4 is a view similar to Fig. 1 of a slightly modified embodiment. Fig. 5 is a diagrammatic plan of a further embodiment.

In the pasteurization of certain liquids, as beer and the like, it has been proposed to heat the liquid while contained in bottles by sprinkling thereon water or other heating media in sufficient quantities and at sufficient temperature for assuring pasteurization, but these apparatus have been found expensive to construct and uneconomic in maintenance, and it is for the purpose of attaining the advantages of such proposed apparatus without the objection thereto that this invention has been produced. One of the objections to the proposed apparatus above mentioned is the fact that when water is merely sprinkled upon a bottle it does not uniformly deliver heat units thereto, and to the end of obviating this difficulty the present apparatus provides for the delivery in a continuous stream of a thin film or sheet constantly enveloping substantially the entire body of the bottle, and this being carried out in multiple and by very simple apparatus renders the present invention especially effective.

Referring to the accompanying drawing by numerals, 1 indicates a pan having an exterior contour adapting it to snugly fit within the conventional case 6. The pan 1 is provided with a flange 2 about its upper edge adapted to overhang the upper edge of the respective case, and the pan is formed with a series of inverted cup-shaped caps 3, there being as many caps 3 as there are bottles 5 adapted to be contained in the case 6. Each cap 3 may be formed in the pan 1 in any suitable manner, as by being stamped from the material of the pan, so that the lower end of each cap 3 is open and freely admits the upper end portion of the respective bottle 5. The vertical wall of each cap 3 is perforated by a series of apertures 4, each of said apertures being V-shaped with the wider portion of the V terminating sufficiently below the upper end of the cap for providing an imperforate area for surrounding the upper end portion of the respective bottle. Each bottle 5 is sustained on the usual crossed wire base 7 of case 6, and the parts are proportioned so as to cause the extreme upper end portion of each bottle 5 to extend into the imperforate portion of the respective cap 3 and to at the same time expose the extreme portion of the neck of the bottle so far as contents thereof are considered to the direct action of the influx of water through the apertures 4, the larger quantities being admitted nearest the liquid level in the bottle, so that the upper portions of the neck of the bottle will receive as much water as the shoulder of the bottle, and there will be no tendency of the streams of water to break before distribution as a sheet over the bottle, and the contents of the bottle are, therefore, directly subjected to the diffused heat from the water. There is, therefore, an entire obviation of a failure to heat the entire contents of the bottle and of any dependence upon the rising of heat from lower portions of such contents. It will be observed that the imperforate area of each cap 3 serves as a temporary cover for the contained bottle and obviates liability of water entering the open neck of the bottle.

In practice, I employ a system such as indicated in diagram in Fig. 3. In this figure a series of cases 6, consisting preferably of a number of stacks of superimposed cases rest upon a grating 7', which latter is sustained by an inclined floor 8 converging to a drain pipe 9. The pipe 9 is provided with a branch 10 controlled by a three-way valve 12 and emptying into a hot water collection tank 11. Pipe 9 is provided with a second branch pipe 13 which empties into a warm water collection tank 14, and is controlled by a three-way valve 15. The pipe 9 is further provided with a branch or terminal portion 16 emptying into a cold water collection tank 17 and controlled by valve 18. A pipe 19 leads from the tank 11 and discharges at points above the several stacks of cases 6, pipe 19 being provided with branch pipes, as 31 and 32, for each of the said stacks, and the branch pipes being appropriately controlled by valves 33 and 34. A pump 21 is disposed in the length of the pipe 19 for maintaining the circulation from tank 11 to the stacks of cases. A pipe 27 leads from tank 14 and extends above the stacks of cases 6, being provided with a branch, as 23, 24, for each stack of cases, and each branch is controlled by a suitable valve, as 25, 26. A pump 29 is disposed in the length of the pipe 27 for maintaining circulation therein. The liquid in tank 11 is heated in any preferred manner, as by steam supplied through a pipe 20 controlled by a valve 22. A pipe 35 leads from the tank 17 to a pump 36 which discharges into a tube 37, the latter extending to points above the stacks of cases 6, and being provided with a branch pipe 38, 39, for each stack, the discharge through the branch pipes being controlled by appropriate valves 40 and 41. The liquid in tank 17 may be refrigerated in any ordinary manner, as by the expansion of compressed ammonia in suitable cooling coils in the tank (not illustrated) supplied with ammonia or other cooling agent through pipes 42.

In carrying out the operation, a pan 1 is provided for each case 6, and the cases are superimposed with the bottles in each lower case vertically alined with the bottles of the next higher case. The valves 15 and 18 are closed and the valve 12 is turned to a position for delivering water through the branch 10 to tank 11 and thereupon the valves 33, 34, are opened and water thus supplied to the uppermost pans 1. Each of said uppermost pans is maintained substantially full of water at the requisite temperature for pasteurizing the contents of the several bottles. The water, entering through the several apertures 4, forms and maintains a heating film or sheet about all parts of the body of the bottle, including the bottom, the film or sheet converging substantially centrally of the bottom of the bottle into a stream which strikes the top of the cap 3 of the next lower pan. The water descends through the apertures 4 of such lower cap, and again forms a film or sheet about the respective bottle and so descends throughout all the bottles that are alined vertically. It will be observed that if there is any tendency toward deviation in the course of the water from an upper bottle to the next lower bottle such tendency will be effectively corrected by the lower pan, but I find that there is very little tendency of this kind and that I am able to gain exceptionally efficient results by the employment of only the uppermost pan and the omission of all of the lower ones, as, for instance, as indicated in Fig. 4.

In Fig. 4, I have not only illustrated the above suggested omission but have modified the construction of the pan as indicated at 1ª which is provided with the supporting flange 2ª resting upon the upper edge of the case 6ª. The pan 1ª is not provided with cups or caps such as seen at 3 in Fig. 1, but instead are provided with mere annular collars 3ª adapted to accommodate the neck or upper portions of the respective bottles 5ª which rest upon the crossed wire support 7ª of the case. Each bottle 5ª in this embodiment is preferably provided with the crimped metal cap 4ª which absolutely insures against access by the heating water to the contents of the respective bottles. In this embodiment the operation is carried out exactly like the embodiment illustrated in Fig. 1 except that the upper ends of the bottles are not protected by the pan since they are protected by the crimped caps and therefore caps 3 of the pan are unnecessary. Only the uppermost case is provided with a pan, the converging film or thin sheet of water descending in a stream from the central portion of the bottom of the upper bottle to the top of the next lower bottle and spreading therefrom into a film enveloping such lower bottle, and so on down throughout the series.

After the milk has been fully pasteurized, the valves 33 and 34 are closed, and the valve 12 is turned for cutting off pipe 10 and opening communication to valve 15, which latter valve is turned to afford communication through pipe 13, to tank 14, the valve 18 remaining closed. The valves 25 and 26 are then opened and the warm water is allowed to descend over the bottles in exactly the same manner as the hot water but only for sufficient time for reducing the temperature so as not to endanger the bottles when the cold water is turned on. When the desired reduction has been effected, the valves 33 and 34 are closed, and valve 15 is turned to cut off communication with branch 13 and to afford communication with valve 18, which latter valve is opened to afford communication through pipe 16 to tank 17.

Thereupon the valves 40 and 41 are opened and the cooling agent delivered in exactly the same manner as the heating agent was delivered, and this is continued until the milk is ready for service. The cases are then removed and may be placed in wagons for immediate delivery of the milk.

It is, of course, perfectly obvious that the present invention appertains to the pasteurization of any substance adapted to be pasteurized, and where the term "milk" is employed it is only illustrative. Furthermore, the operation as above stated is merely that incident to a very short operation or when first starting, it being preferable as soon as the liquid in tank 14 has become somewhat heated by the heat from the receptacles which it has been cooling to employ the liquid from tank 14 as the initial heating medium. That is to say, after the operation has been carried out sufficiently for appreciably raising the temperature of the liquid in tank 14 the operation will consist in first supplying liquid from tank 14 to the stacks of cases, then supplying liquid from the tank 11 thereto, then again supplying liquid from tank 14 (after pasteurization has been completed), and finally supplying the cooling liquid from tank 17. Thus the liquid in tank 14 is employed as a heating liquid for the cold receptacles and as a cooling liquid for the hot receptacles, whereby it is unnecessary to provide any means for maintaining the contents of tank 14 warm. By way of further illustrating this double use of the warming liquid, I have illustrated in Fig. 5 an extremely desirable embodiment in which 8' indicates a supporting platform which is rotatably mounted on a circular track or turntable 8''. Mounted on the platform 8' or on suitable gratings sustained thereby are the stacks of cases 6. It will be observed that four stacks of cases are shown, but obviously any multiple thereof may be provided. A pipe 27' leads from a tank similar to tank 14 to a point above each of two of the stacks 6, the two pipes 27' being diametrically opposite each other, and the stack 6 at one side of the diametrical line thus represented is supplied with hot water through pipe 19' and the other stack 6 is supplied with refrigerating water through a pipe 37'. The operation of this device consists in supplying a stack of cases 6 on platform 8' beneath pipe 37', and then rotating the platform 8' until the stack arrives beneath one of the pipes 27'. The warm water is then turned on through the respective pipe 27' and the supply is continued until the temperature of the receptacles is raised sufficiently to obviate danger of breakage from the higher temperature. While this is going on, a second stack of cases 6 is being applied to the platform 8' beneath the pipe 37', and then the platform 8' is revolved so as to bring the first stack beneath the hot water pipe 19' and to bring the second stack beneath the respective pipe 27'. The warm water is continued to be supplied through the pipe 27' and the hot water is turned on through the pipe 19'. The supply through pipe 19' is maintained until perfect pasteurization is attained, and in the meantime a third stack of cases is supplied to the platform 8' beneath pipe 37', and upon the completion of the pasteurization of the contents of the first stack the platform 8' is again revolved for bringing the third stack beneath one of the pipes 27', the second stack beneath the pipe 19', and the first stack beneath the other pipe 27'. The warm water is turned on through the second pipe 27' and the supply thereof is thereafter continued. As the operation continues the supply through both the pipes 27' and through pipe 19' is maintained continuously, the liquid from the two pipes 27' being collected in the same receptacle, that portion of the liquid which passes down over the hot receptacles serving to raise the temperature of the warm water and that passing down over the fresh receptacles tending to lower the temperature thereof so as to effect a substantial balance and gain the saving in heat units incident to utilizing the heat given off by the hot receptacles in warming the fresh or cool receptacles.

When the desired pasteurization has been accomplished with respect to the second stack, a fourth stack having in the meantime been supplied to the platform 8' beneath pipe 37', the platform 8' is revolved for bringing the first stack beneath pipe 37', the fourth stack beneath one of the pipes 27', the second stack beneath the other pipe 27', and the third stack beneath the pipe 19'. The cooling agent is then turned on through pipe 37' and maintained until the several receptacles and their contents have been cooled and rendered ready for delivery. Thereupon the first stack is removed and a new stack is supplied to the platform 8' beneath the pipe 37'. In the meantime, the third stack will have been subjected to the pasteurizing operation, the second stack reduced in temperature preparatory for cooling by the refrigerating agent and the fourth stack heated preparatory to receiving the pasteurizing temperature. After the pasteurization of the third stack, the platform 8' is again revolved to bring a fresh stack beneath one of the pipes 27', the other stacks continuing in the rotation above named, and the operation being completed continuously in the successive steps of warming, heating to pasteurization, cooling, and finally refrigerating. The supply through the pipes 27' and 19' is, therefore, continuous, but the supply through pipe 37' is intermittent, being turned off when a new stack is to be applied to the platform 8' and turned on again when the platform is revolved for bringing a stack from beneath one of the pipes 27' to a point beneath one of the pipes 37'.

In the construction of pan 1 it is desirable to provide relatively small apertures 28 adjacent the caps 3 through the floor of the pan, the apertures being disposed to direct their streams against the sides of the receptacles 5 so as to add the effect of the liquid discharged therethrough, but the primary object of the apertures 28 is to insure draining of the pan after a given operation.

What I claim is:—

1. In an apparatus for pasteurizing substances while in containers, a pan or trough for distributing the pasteurizing agent upon the containers, said pan or trough having openings in its bottom, through which the tops of the containers may project, and formed to deliver the pasteurizing liquid directly upon the sides of the containers.

2. In pasteurizing apparatus, a pan adapted to deliver pasteurizing fluid to receptacles, the bottom of the pan being formed with apertures each adapted to have the upper portion of a receptacle introduced therethrough, and each of such apertures being formed for enabling the discharge of liquid from the pan substantially horizontally about the outer surface of the respective receptacle.

3. In pasteurizing apparatus, a pan having openings in its bottom adapted to accommodate therein upper portions of receptacles, the openings being proportioned to snugly surround the respective receptacles and to permit access of the liquid from the pan to the body of each of the receptacles, the liquid discharging laterally from the pan upon the sides of the receptacles and descending over the bodies of the receptacles in the form of a thin sheet.

4. In pasteurizing apparatus, a pan adapted to have upper portions of receptacles extended through its bottom, the pan being formed with an apertured bottom for accommodating such upper portions of the receptacles, and the apertures being formed for enabling the discharge of liquid from the pan substantially horizontally about the outer surfaces of the receptacles, and means for sustaining the pan out of contact with the receptacles.

5. In pasteurizing apparatus, a pan having a series of caps upstanding from the bottom of the pan, each having its lower end open for accommodating the upper end portion of a receptacle within the respective cap, the side walls of the cap being apertured for admitting liquid from the pan to the outer surfaces of the receptacle.

6. In pasteurizing apparatus, a pan having a series of caps upstanding from the bottom of the pan, each having its lower end open for accommodating the upper end portion of a receptacle within the respective cap, the side walls of the cap being apertured for admitting liquid from the pan to the outer surfaces of the receptacle, the extreme upper portion of each cap being imperforate and being adapted to surround the extreme upper portion of its respective receptacle.

7. In pasteurizing apparatus, a pan having caps upstanding from its bottom, each cap having its lower end open for accommodating the upper end portion of a receptacle, the side walls of the cap being formed with V-shaped apertures for admitting liquid from the pan to the outer surfaces of the receptacle.

8. In pasteurizing apparatus, a pan adapted to surround upper portions of receptacles, the pan being formed with an apertured bottom for accommodating such upper portions of the receptacles, and the apertures being formed for enabling the discharge of liquid from the pan substantially horizontally about the outer surfaces of the receptacles, and the bottom of the pan being formed with draining apertures disposed for discharging against portions of the receptacles.

9. In an apparatus for pasteurizing substances while in containers, a liquid distributer comprising a pan or trough and caps, the pan or trough formed with openings in its bottom through which the tops of the containers may project, and the caps extending upward from the bottom of the pan or trough and covering said openings, said distributer being also formed with perforations arranged to deliver the pasteurizing agent against the sides of the containers.

In testimony whereof I affix my signature in presence of two witnesses.

BENJAMIN D. WHITE.

Witnesses:
J. EDWIN GILES,
EDGAR M. KITCHIN.